(12) United States Patent
Greenwalt

(10) Patent No.: US 6,197,088 B1
(45) Date of Patent: Mar. 6, 2001

(54) PRODUCING LIQUID IRON HAVING A LOW SULFUR CONTENT

(75) Inventor: Richard B. Greenwalt, Danville, CA (US)

(73) Assignee: Bechtel Group, Inc., San Francisco, CA (US)

( * ) Notice: Subject to any disclaimer, the term of this patent is extended or adjusted under 35 U.S.C. 154(b) by 0 days.

(21) Appl. No.: 09/270,122

(22) Filed: Mar. 15, 1999

Related U.S. Application Data

(62) Continuation-in-part of application No. 08/745,570, filed on Nov. 8, 1996, now abandoned, which is a continuation-in-part of application No. 08/416,798, filed as application No. PCT/US93/08648 on Sep. 14, 1993, now Pat. No. 5,630,862, which is a continuation-in-part of application No. 08/084,888, filed on Jun. 30, 1993, now Pat. No. 5,397,376, which is a continuation-in-part of application No. 08/056,341, filed on Apr. 30, 1993, now Pat. No. 5,259,865, which is a continuation-in-part of application No. 07/991,914, filed on Dec. 17, 1992, now Pat. No. 5,354,356, which is a continuation-in-part of application No. 07/958,043, filed on Oct. 6, 1992, now Pat. No. 5,259,864, which is a continuation-in-part of application No. 08/167,268, filed on Dec. 15, 1993, now Pat. No. 5,558,696.

(60) Provisional application No. 60/026,460, filed on Sep. 20, 1996.

(51) Int. Cl.$^7$ ..................................................... C21B 11/00
(52) U.S. Cl. ............................... 75/492; 75/501; 75/502; 75/561; 75/567; 420/29; 420/31
(58) Field of Search ......................... 75/492, 501, 502, 75/561, 567; 420/29, 31

(56) References Cited

U.S. PATENT DOCUMENTS 3,850,615  11/1974  Reeves ...................... 75/26
4,070,181  1/1978  Widell ....................... 72/91
4,073,642  2/1978  Collin et al. ................ 75/35

(List continued on next page.)

FOREIGN PATENT DOCUMENTS

468950 A2  1/1991  (EP) .

OTHER PUBLICATIONS

Fleichtner, et al., "The Corex Process," Skillings' Mining Review, pp. 20–27 (Jan. 14, 1989).
Lemperle, et al., "Co–Generation with Corex®," Presented During 1991 AISE Annual Convention, Pittsburgh, Pennsylvania (Sep. 1991).
COREX° Brochure—Hot News From COREX°, No. 2 (Sep. 1991).

*Primary Examiner*—Melvyn Andrews
(74) *Attorney, Agent, or Firm*—Townsend and Townsend and Crew LLP

(57) ABSTRACT

A method of liquid iron production using high sulfur fuels is provided in which the level of sulfur in the iron is maintained below 0.1%. The low sulfur content is achieved even in the presence of high sulfur concentrations in the reducing gases and without the introduction of lime or limestone. According to one aspect, liquid iron in the fusion zone of a smelting system is saturated with carbon, thereby desulfurizing the liquid iron. The carbon saturation level is at least 4.5% carbon by weight and preferably, at least 5.0% carbon by weight. According to another aspect, the desulfurization of the liquid iron is enhanced by elevating the tapping temperatures to temperatures in excess of 1465° C., and preferably of about 1490° C. According to another aspect, the desulfurization process is supplemented by the presence of significant levels of silicon and/or manganese, both of which are highly soluble in the liquid iron. In a least one embodiment, the silicon levels in the fusion zone are maintained at greater than 0.3% and preferably greater than 0.5%. Manganese can be substituted for, or used in addition to, the silicon. Preferably the manganese level in the fusion zone is maintained at a level of greater than 0.3% and more preferably greater than 0.5%.

19 Claims, 5 Drawing Sheets

U.S. PATENT DOCUMENTS

| | | | |
|---|---|---|---|
| 4,317,677 | 3/1982 | Weber et al. | 75/43 |
| 4,389,042 | 6/1983 | Wynne | 266/210 |
| 4,396,421 | 8/1983 | Stift et al. | 75/11 |
| 4,409,023 | 10/1983 | Weber et al. | 75/38 |
| 4,448,402 | 5/1984 | Weber et al. | 266/183 |
| 4,504,043 | 3/1985 | Yamaoka et al. | 75/492 |
| 4,542,889 | 9/1985 | Vuletic | 266/137 |
| 4,543,123 | 9/1985 | Vuletic | 75/34 |
| 4,564,389 * | 1/1986 | Yamaoka et al. | 75/492 |
| 4,566,904 | 1/1986 | von Bogdandy et al. | 75/492 |
| 4,588,437 | 5/1986 | Kepplinger et al. | 75/43 |
| 4,605,205 | 8/1986 | Langner et al. | 266/160 |
| 4,673,432 | 6/1987 | Hauk | 75/38 |
| 4,708,736 | 11/1987 | Hauk et al. | 75/26 |
| 4,725,308 | 2/1988 | Kepplinger | 75/26 |
| 4,728,360 | 3/1988 | Hauk et al. | 75/26 |
| 4,755,219 | 7/1988 | Hauk | 75/10.22 |
| 4,784,689 | 11/1988 | Vuletic | 75/38 |
| 4,793,855 | 12/1988 | Hauk | 75/26 |
| 4,793,857 | 12/1988 | Vuletic | 75/34 |
| 4,805,880 | 2/1989 | Hauk et al. | 266/87 |
| 4,806,154 | 2/1989 | Hauk | 75/10.19 |
| 4,806,158 | 2/1989 | Hirsch et al. | 75/26 |
| 4,822,411 | 4/1989 | Standler et al. | 75/35 |
| 4,846,449 | 7/1989 | Hauk et al. | 266/172 |
| 4,849,015 | 7/1989 | Fassbinder et al. | 75/26 |
| 4,850,574 | 7/1989 | Vuletic | 266/172 |
| 4,854,967 | 8/1989 | Hauk | 75/34 |
| 4,857,284 | 8/1989 | Hauk | 75/34 |
| 4,861,369 | 8/1989 | von Bogdandy et al. | 75/492 |
| 4,865,626 | 9/1989 | Papst et al. | 48/210 |
| 4,874,427 | 10/1989 | Hamada et al. | 75/26 |
| 4,878,943 | 11/1989 | Kepplinger | 75/25 |
| 4,889,323 | 12/1989 | Pusch et al. | 266/142 |
| 4,891,062 | 1/1990 | Vuletic | 75/28 |
| 4,895,593 | 1/1990 | Sulzbacher et al. | 75/26 |
| 4,897,179 | 1/1990 | Mori et al. | 208/127 |
| 4,898,366 | 2/1990 | Vuletic | 266/160 |
| 4,913,733 | 4/1990 | Hauk | 75/491 |
| 4,946,498 | 8/1990 | Weber | 75/26 |
| 4,955,587 | 9/1990 | Sulzbacher | 266/156 |
| 4,957,545 | 9/1990 | Hikosaka et al. | 75/501 |
| 4,958,808 | 9/1990 | Hauk | 266/154 |
| 4,978,387 | 12/1990 | Kepplinger | 75/445 |
| 5,043,011 | 8/1991 | Hauk | 75/446 |
| 5,259,864 | 11/1993 | Greenwalt | 75/445 |
| 5,259,865 | 11/1993 | Greenwalt | 75/445 |
| 5,320,676 | 6/1994 | Greenwalt | 75/445 |
| 5,338,336 | 8/1994 | Greenwalt | 75/445 |
| 5,354,356 | 10/1994 | Greenwalt | 75/445 |
| 5,380,352 | 1/1995 | Greenwalt | 75/445 |
| 5,397,376 | 3/1995 | Greenwalt | 75/445 |
| 5,413,662 | 5/1995 | Greenwalt | 75/446 |
| 5,470,375 | 11/1995 | Greenwalt | 75/505 |
| 5,558,696 | 9/1996 | Greenwalt | 75/505 |
| 5,630,862 | 5/1997 | Greenwalt | 75/492 |

* cited by examiner

PRODUCING LIQUID IRON HAVING A LOW SULFUR CONTENT

CROSS-REFERENCES TO RELATED APPLICATIONS

This application is a continuation-in-part of U.S. patent application Ser. No. 08/745,570, filed Nov. 8, 1996, now abandoned which is a continuation-in-part of U.S. patent application Ser. No. 08/416,798, filed Jun. 15, 1995, now U.S. Pat. No. 5,630,862, which is a 371 of PCT/US93/08648, filed Sep. 14, 1993 and a continuation-in-part of U.S. patent application Ser. No. 08/084,888, filed Jun. 30, 1993, now U.S. Pat. No. 5,397,376, which is a continuation-in-part of U.S. patent application Ser. No. 08/056,341, filed Apr. 30, 1993, now U.S. Pat. No. 5,259,865, which is a continuation-in-part of U.S. patent application Ser. No. 07/991,914, filed Dec. 17, 1992, now U.S. Pat. No. 5,354,356, which is a continuation-in-part of U.S. patent application Ser. No. 07/958,043, filed Oct. 6, 1992, now U.S. Pat. No. 5,259,864; this application also claims the benefit of U.S. Provisional Application No. 60/026,460, filed Sep. 20, 1996, which is a continuation-in-part of Ser. No. 08/167,268, filed Dec. 15, 1993, now U.S. Pat. No. 5,558,696, issued Sep. 24, 1996.

This application is also related to the following U.S. patents by the same inventor and assigned to the same assignee; No. 5,413,622, issued May 9, 1995 and No. 5,320,676, issued Jun. 14, 1994; all of which are incorporated herein by reference for all purposes.

BACKGROUND OF THE INVENTION

In the smelting and production of liquid iron, the ironmaking system normally consists of iron oxide and a carbonaceous fuel processed by hot air or oxygen blowing at elevated temperatures. The carbon from the fuel forms carbon monoxide (CO) which serves as the reductant for the iron oxide. In addition, the carbonaceous fuel supplies elemental carbon with is soluble in the liquid iron and is commonly the source of sulfur in the reduction system. This sulfur, during ironmaking, is generally in the gaseous form of hydrogen sulfide ($H_2S$) with minor amounts of carbonyl sulfide (COS). These gaseous forms of sulfur are highly soluble in the liquid iron. At ironmaking temperatures of 1500° C., up to 36.5% of the sulfur by weight is soluble in the liquid iron with a series of liquid solutions from pure iron to a composition higher in sulfur than iron sulfide (FeS). In these compositions of iron sulfide there is a eutectic composition at 31% sulfur having a melting temperature of 988° C. Therefore throughout the smelting process, conducted above the eutectic temperature level, hot metallic or liquid iron has a high affinity for and is a strong absorber of gaseous sulfur.

Any appreciable level of sulfur in the liquid iron typically destroys the malleable metallic properties of the solidified iron for subsequent forming and utilization. In fact, a sulfur content of as little as 0.1% in the liquid iron can ruin the iron for subsequent refining, casting and steelmaking. With high gaseous sulfur concentrations emanating from the carbonaceous fuel in the liquid iron-reducing gas system, the sulfur content of the iron can easily exceed the 0.1% sulfur limit, and are often found to exceed 1.0% in the liquid iron.

Without control of sulfur in the liquid iron, high concentrations of sulfur in the reducing gases cannot be tolerated, thus limiting the ironmaking process to low sulfur iron ores and low sulfur fuels. Therefore what is needed is a method of maintaining the desired low sulfur levels in the liquid iron even in the presence of high sulfur gases, thereby enabling the production of liquid iron utilizing high sulfur carbonaceous fuels (i.e., petroleum coke, low ash high sulfur coals). The present invention provides such a method.

SUMMARY OF THE INVENTION

In accordance with the invention, it has been found that by adhering to specific smelting parameters, the sulfur in the liquid iron can be controlled and a low sulfur liquid iron can be produced in which the sulfur content is less than 0.1% and is preferably less than or equal to 0.02%. The low sulfur content is achieved even in the presence of high sulfur concentrations in the reducing gases and without the introduction of lime or limestone.

According to one aspect of the invention, liquid iron in the fusion zone of a smelting system is saturated with carbon, thereby desulfurizing the liquid iron without adding lime or limestone to the fusion zone. The carbon saturation level is at least 4.5% carbon by weight. At 4.5%, carbon is highly soluble in liquid iron and a low melting eutectic of ferrite and iron carbide ($Fe_3C$-cementite) is formed at 1130° C. The high carbon levels in the iron reject the sulfur dissolved in the liquid iron and maintain a satisfactory low level of sulfur (i.e., less than 0.1%) even in the presence of sulfur rich reducing gases.

According to another aspect of the invention, the desulfurization of the liquid iron can be enhanced by elevating the tapping temperatures to temperatures in excess of 1465° C., and preferably of at least 1490° C. Additionally, the desulfurization process can be supplemented by the presence of significant levels of silicon and/or manganese, both of which are highly soluble in the liquid iron. In a least one embodiment of the invention, the silicon levels in the fusion zone are maintained at greater than 0.3% and preferably greater than 0.5%. Manganese can be substituted for, or used in addition to, the silicon. Preferably the manganese level in the fusion zone is maintained at a level of greater than 0.3% and more preferably greater than 0.5%.

According to another aspect of the invention, in order to achieve sulfur concentrations in the liquid iron of below 0.04%, the combined carbon, silicon, and manganese levels in the liquid iron in the fusion zone are at least 5.0%, and preferably greater than 5.2%. Higher carbon levels and higher combined levels of carbon, silicon, and manganese produce residual sulfur levels in the liquid iron of 0.02% or less. In at least one embodiment, the combined concentration of silicon and manganese is at least 1.0%.

A further understanding of the nature and advantages of the present invention may be realized by reference to the remaining portions of the specification and the drawings.

DESCRIPTION OF THE SPECIFIC EMBODIMENTS

Figure 1:
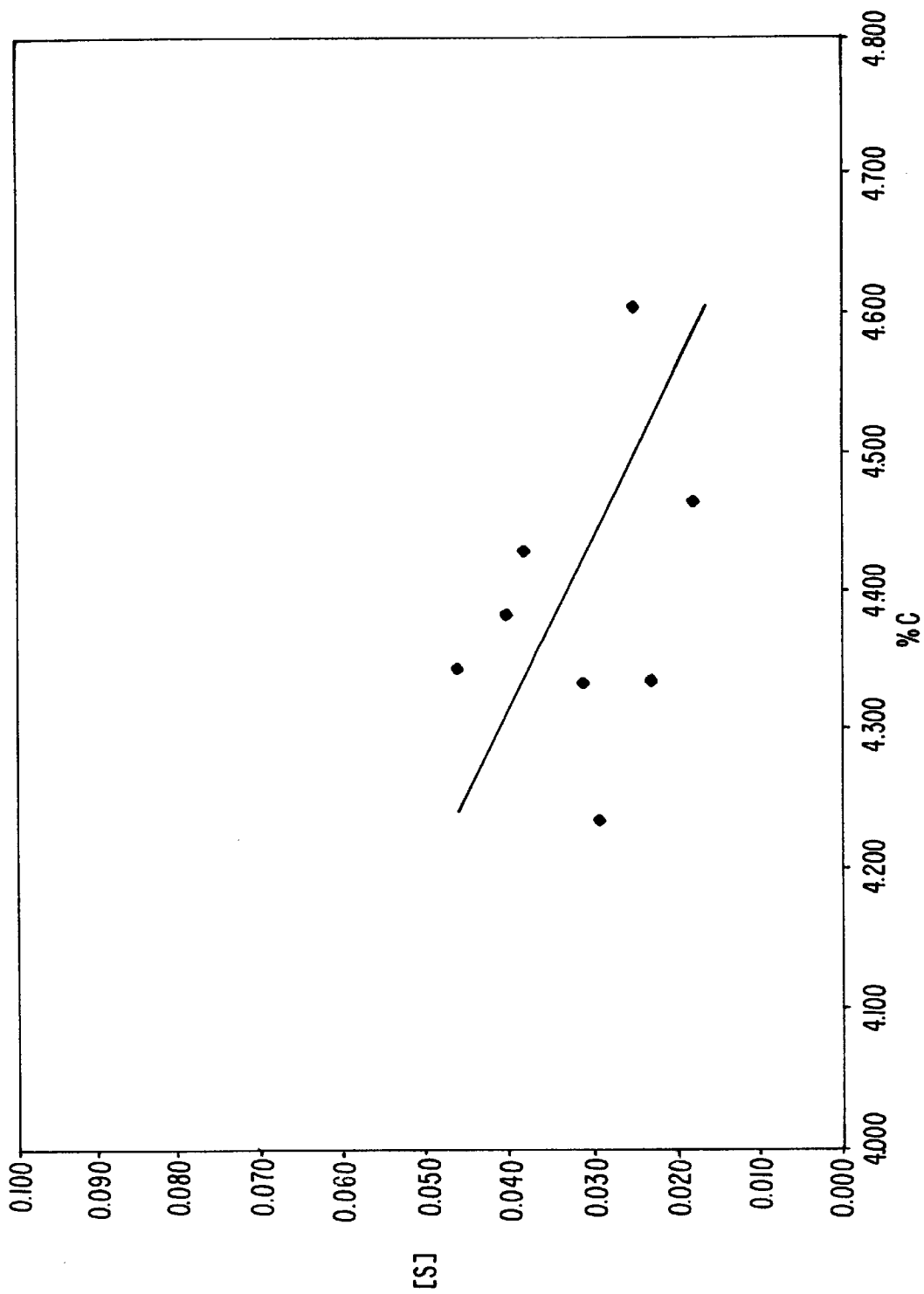
FIG. 1 is a graph of the percent by weight of carbon in the liquid iron versus the percent by weight of sulfur in the liquid iron.

The method of the present invention is useful with known commercial ironmaking practices and systems including the Corex® ironmaking system. These practices include the conventional blast furnace, the submerged arc furnace, and the cupola furnace. Additionally, the present sulfur control technique is applicable to ironmaking by emerging technologies that are adaptations of open hearth, converter, cupola, and horizontal vessel (e.g., QSL) technology.

Through the control of the sulfur content in the liquid iron, high sulfur, low-cost solid fuels can be used as the source of the smelter reductant. Residual high sulfur concentration in effluent gases can be controlled by standard modifications to the furnace offgas systems for gaseous sulfur elimination. In some processes such as the Corex® system, the reduced iron is sulfidized with sulfur from the high sulfur fuel gases prior to carbon saturation in the furnace fusion zone. The sulfur is eliminated from the sulfidized iron by the carbon saturation of the liquid iron in the fusion zone, where the carbon content is maintained at a level greater than 4.5%. Unless otherwise stated, the percentages of elements used herein are by weight of the liquid iron.

In order to achieve carbon saturation and desulfurization of the liquid iron according to the invention, it is desirable to control the height or depth of the fusion zone from about 0.15 to 3 meters. The height/depth of the fusion zone is maintained by an excess of coarse carbon particles which form a bed interspersed with sulfidized metallic iron in the fusion zone. The coarse carbon particles which emanate from the devolatilized and desulfurized carbonaceous fuel charge are embedded in a plastic semi-molten matrix with the metallic iron. The carbon or coke particles can range from 0.25 millimeters to substantially larger than 6 millimeters in size. The carbon saturated desulfurized liquid iron has a lower melting than pure iron and collects in droplets on the hearth of the Corex® smelter furnace in preparation for periodic tapping.

The sulfur concentration released from the liquid iron in the offgases of the method of the invention is handled by the standard sulfur removal techniques previously referenced. These techniques include sulfur removal devices to control the sulfur concentration in the furnace offgases released to the atmosphere. These standard sulfur removal devices can be arranged such that the high sulfur offgases from the offgas scrubbers are stripped of the hydrogen sulfide and carbonyl sulfide gases, thus allowing the gases to be recycled to the smelter furnace. The hydrogen sulfide and carbonyl sulfides in the offgas are stripped as elemental sulfur for marketing, storage, or disposal.

The invention provides a method of producing liquid iron in a fusion zone of a smelting process having a low sulfur content when using carbonaceous fuel containing substantial sulfur which, when combusted, forms gases having a high sulfur content. This method does not require the addition of lime or limestone to the fusion zone during desulfurization. In accordance with the invention the liquid iron is saturated with at least 4.5%, and preferably at least 4.7%, of carbon by weight of the liquid iron. Preferably there is also at least 0.3% of silicon and more preferably at least 0.5% of manganese by weight in solution with the liquid iron during formation of the liquid iron in the fusion zone during the smelting process. The temperature of the liquid iron in the fusion zone is maintained in excess of 1,465° C. Preferably the temperature of the liquid iron in the fusion zone is maintained between about 1,465° C. and 1,550° C. and, most preferably, the temperature of the liquid iron in the fusion zone is maintained at about 1,490° C.

In a preferred embodiment, the smelting process is carried out in a melter gasifier having a fusion zone of about 0.15 to 3 meters, and preferably between about 2 and 3 meters. The temperature of the liquid iron in the fusion zone is maintained in excess of 1,450° C. and preferably at a temperature of between about 1,465° C. and 1,550° C., and more preferably, about 1,490° C.

Tables 1 and 2 below contain data relating to the method of the present invention. This data was used to plot the curves shown in FIGS. 1–3. Table 1 shows the percentages of carbon (i.e., C), silicon (i.e., Si), manganese (i.e., Mn), and sulfur (i.e., S) by weight contained in the liquid iron as well as the temperature, in degrees Centigrade, for each tap. Table 2 shows the percentage by weight of the various oxides as well as sulfur in the slag for each tap. The liquid iron desulfurization is independent of the slag quantity and composition.

TABLE 1

| Tap No. | % C | % Si | % Mn | % S | Temp (° C.) | Metal Weight (kg) |
|---|---|---|---|---|---|---|
| 940263 | 4.355 | 0.315 | 0.575 | 0.023 | 1526 | 126400 |
| 940264 | 4.605 | 0.285 | 0.520 | 0.025 | 1493 | 110750 |
| 940265 | 4.345 | 0.245 | 0.470 | 0.046 | 1506 | 140300 |
| 940266 | 4.235 | 0.455 | 0.550 | 0.029 | 1490 | 133200 |
| 940267 | 4.335 | 0.425 | 0.500 | 0.031 | 1465 | 134800 |
| 940268 | 4.385 | 0.435 | 0.480 | 0.040 | 1500 | 138900 |
| 940269 | 4.465 | 0.755 | 0.555 | 0.018 | 1471 | 117900 |
| 940270 | 4.430 | 0.430 | 0.475 | 0.038 | 1501 | 137200 |

TABLE 2

| Tap No. | % C + % Si | % C + % Mn | % C + % Si + % Mn | % C + % Si + % Mn + HMT/1000 |
|---|---|---|---|---|
| 940263 | 4.650 | 4.910 | 5.225 | 6.751 |
| 940264 | 4.890 | 5.125 | 5.410 | 6.903 |
| 940265 | 4.590 | 4.815 | 5.060 | 6.566 |
| 940266 | 4.690 | 4.785 | 5.240 | 6.730 |
| 940267 | 4.760 | 4.835 | 5.260 | 6.725 |
| 940268 | 4.820 | 4.865 | 5.300 | 6.800 |
| 940269 | 5.220 | 5.020 | 5.775 | 7.246 |
| 940270 | 4.860 | 4.905 | 5.335 | 6.836 |

Figure 2:
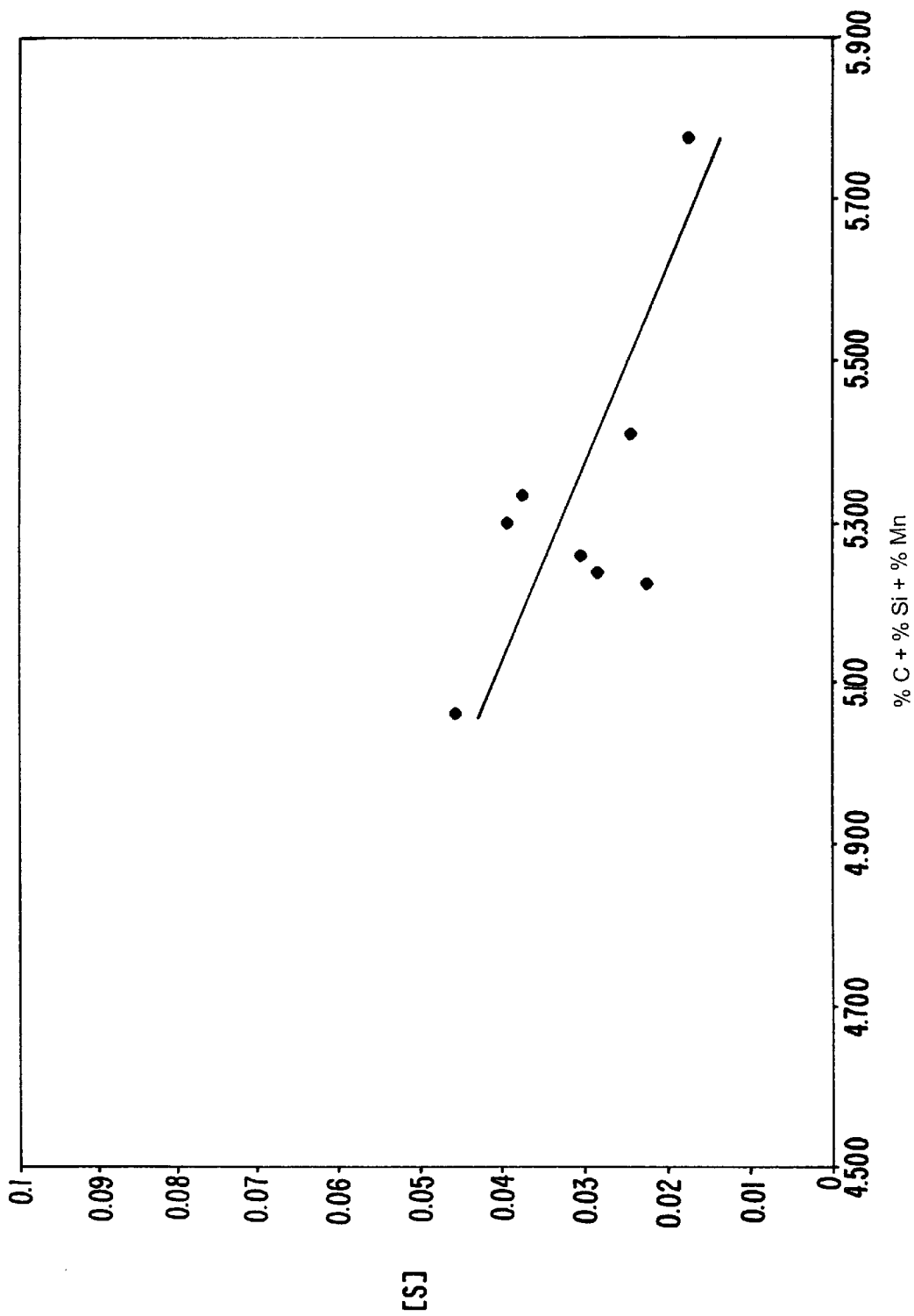
FIG. 2 is a graph of the percent by weight of carbon plus silicon plus manganese in the liquid iron versus the percent by weight of sulfur in the liquid iron.
Figure 3:
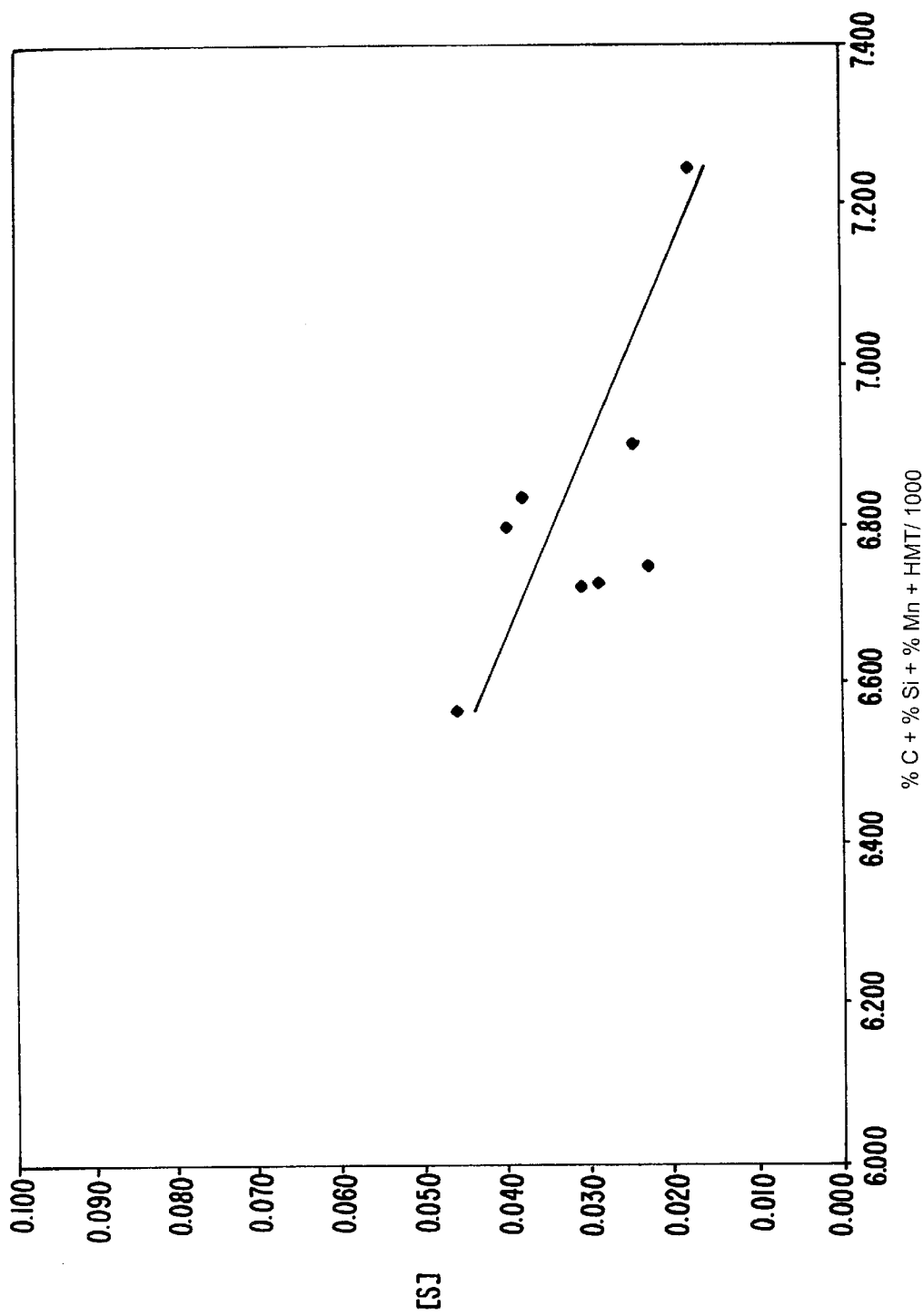
FIG. 3 is a graph of the percent by weight of carbon plus silicon plus manganese plus hot metal temperature divided by 1,000 (i.e., % C+% Si+% Mn+HMT/1000) versus the percent sulfur in the liquid iron.

The test results shown in FIGS. 1–3 and set out in Tables 1 and 2 were obtained with a mixture of coal and high sulfur (i.e., 4.5% sulfur) petroleum coke in a Corex® ironmaking unit. These units and their operation are described in U.S. Pat. Nos. 5,259,864, 5,259,865, 5,320,676, 5,397,376, and 5,413,622, all of which are incorporate by reference herein for all purposes.

Figure 4:
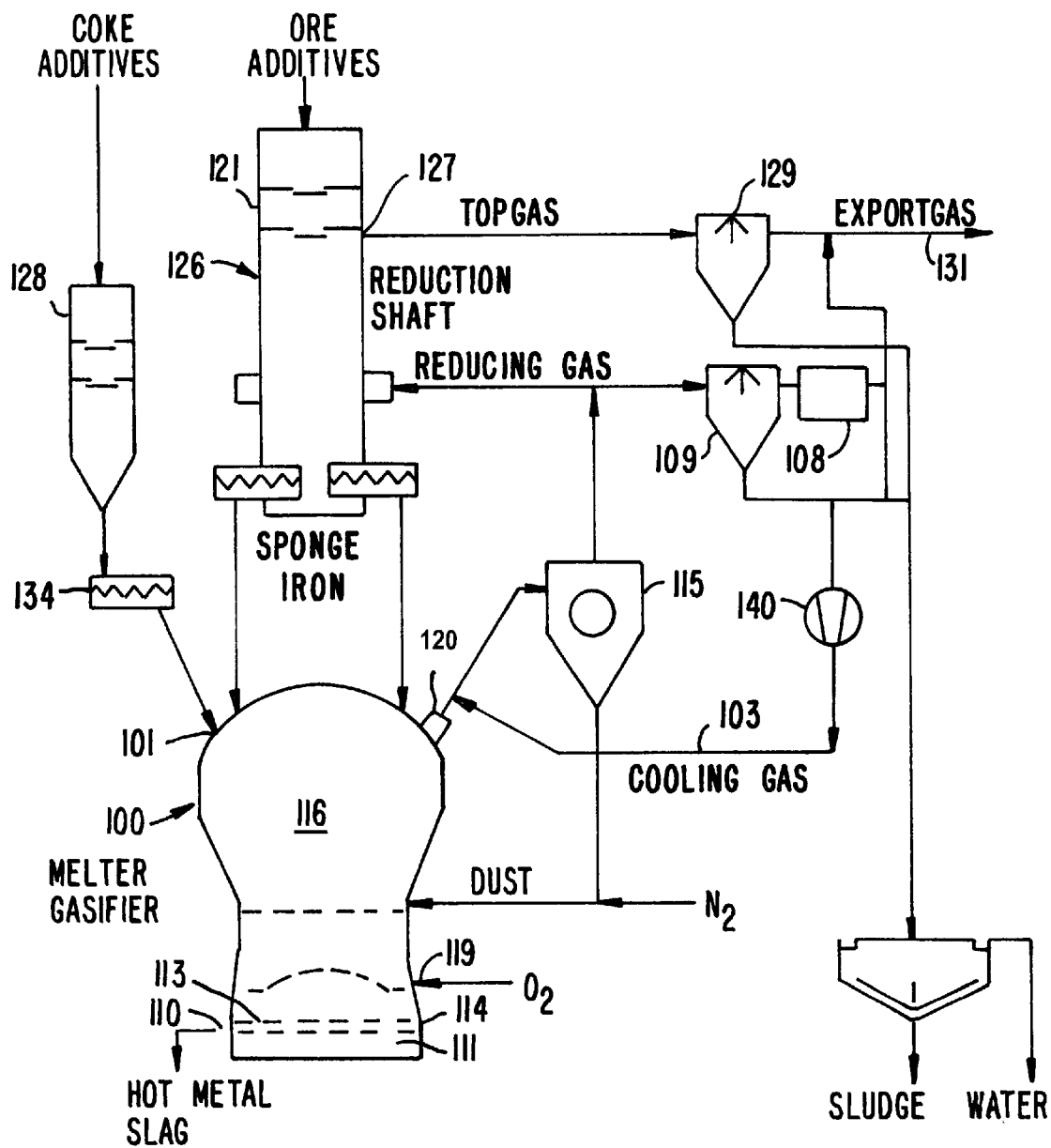
FIG. 4 schematically illustrates a melter gasifier ironmaking process in which the method of the invention is particularly useful.

FIG. 4 illustrates the process flow in a melter gasifier ironmaking process of the type in which the method of the invention is particularly useful. The Corex® process utilizes a melter gasifier substantially similar to the melter gasifier shown in FIG. 5 and generally indicated in FIG. 4 by the numeral 100. The Corex® process is designed to operate under elevated gas pressures of up to five bar gauge, the pressure being supplied from an integral oxygen production facility which supplies oxygen through tuyeres 119 on the melter gasifier 100 and operates the primary direct reduction furnace 126 for iron ore reduction to sponge iron.

Charging of petroleum coke and/or coal to the melter gasifier 100 is accomplished through a pressurized lock hopper 128. The iron ore is supplied to the reduction furnace 126 through a similar lock hopper 121 in a manner well known to those skilled in the art. The petroleum coke and/or coal is stored in a pressurized bin and charged into the melter gasifier by suitable means such as speed controlled feed screw 134.

Upon entering the dome of the melter gasifier 100 at entry port 101, some of the residual hydrocarbons contained in the fuel are flashed off at 1,100° C. and cracked in the reducing atmosphere to carbon monoxide and hydrogen. The sulfur contained in the petroleum coke and coal is gasified to hydrogen sulfide with minor amounts of carbonyl sulfide. The calcined coke particles are rapidly heated to 1,100° C. and descend with the hot reduced sponge iron particles from reduction furnace 126 through the high sulfur gases to the dynamic fluidized bed above the fusion zone.

The sulfidized sponge iron is melted, carbon saturated and desulfidized in the fusion zone generally indicated as bed 116, and dropped into a molten liquid iron pool 111 accumulated below oxygen tuyeres 119 on the melter gasifier hearth 114. The desulfurization of the liquid iron is accomplished without the addition of lime or limestone to the fusion zone. The liquid iron is periodically tapped and removed through a taphole 110 from the melter gasifier hearth. These are the types of taps from which the data in Tables 1 and 2 were derived.

The calcined coke which is essentially all carbon is gasified into carbon monoxide. The combined reducing gases and the carbon monoxide rise to a gasifier gas outlet 120 at approximately 1,100° C. The gases are tempered to 850° C. with a side stream from a cooling gas scrubber 109 and cooling gas blower 140 via line 103 before passing to a hot cyclone 115 and reduction furnace 126. The gasifier gas is passed upward in reduction furnace 126 through the descending bed of iron ore converting it to metallic sponge iron prior to hot discharge at approximately 900° C. to melter gasifier 100. The gasifier offgas cooling is essential to avoid sintering and to maintain discrete free flowing metallic iron particles in the column of reduction shaft furnace 126. Over-heating causes clusters or clinkers to form inside the shaft furnace which disrupts the flow of the furnace solids and gas. The gasifier gases are partially consumed by the reaction in the reduction furnace and discharged at an outlet 127 as furnace top gas, typically at a temperature of about 140° C. If necessary, a standard wet scrubber 129 is installed to remove hydrogen sulfide and water vapor formed during iron ore reduction from cooling gas bleed 127 prior to being discharged as export gas 131 at 40° C. The scrubbed export gas is low in particulates and sulfur and has a heating value of 220 Btu/scf while containing 30% carbon dioxide.

Figure 5:
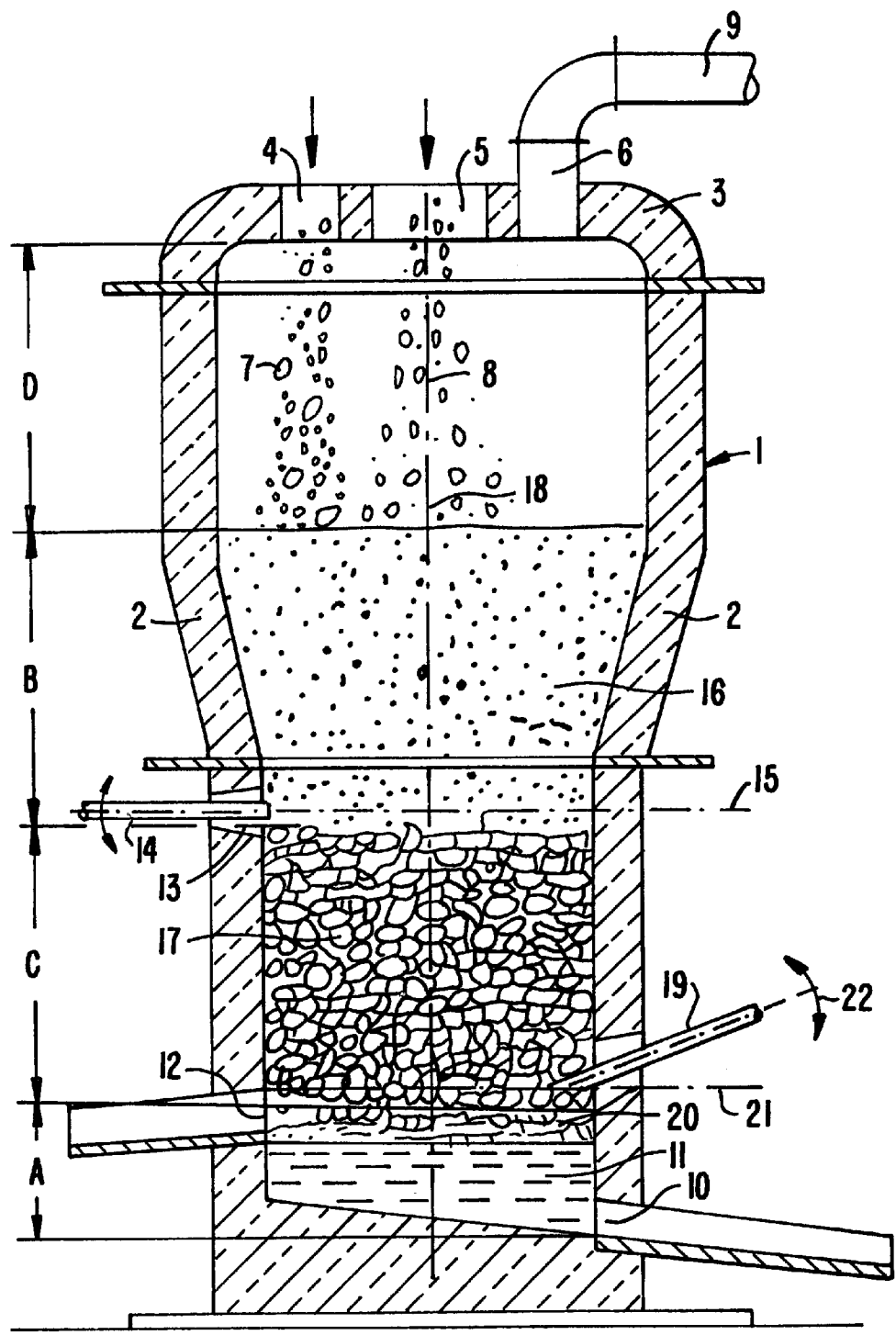
FIG. 5 schematically illustrates a vertical section of a melter gasifier useful in accordance with the present invention.

FIG. 5 schematically illustrates a melter gasifier generally indicated by the numeral 1. Melter gasifier 1 has side walls 2 which are refractory lined on the inner sides. A dome 3 of melter gasifier 1 has three openings 4, 5, and 6. Opening 4 is adapted for charging petroleum coke and/or coal 7 of various sizes into the interior of the melter gasifier. The most useful carbon or coke particles range in size from about 6 millimeters to as large as about 25 millimeters and larger. In accordance with the invention, the amount of carbon or coke particles that should be added to the melter gasifier is determined by the amount of fixed carbon in the coal/coke needed for combustion in the process, any residual wustite (FeO) reduction, maintaining the temperature of the fusion zone, and any additional amount required to saturate the liquid iron with at least 4.5% carbon by weight.

Particulate ferrous material 8 is charged into the melter gasifier through opening 5, preferably in the form of iron sponge. The metallic iron sponge is supplied at an elevated temperature of about 900° C. To carry away the reduction gas which is formed during the reaction in the melter gasifier, a conduit 9 is provided extending out of opening 6. The reduction gas carried away may be used in many processes to pre-reduce or reduce other oxidic iron ore after carbon dioxide removal. When using petroleum coke and/or coal having a high sulfur content, i.e., in excess of 2 to 3%, it may be desirable to provide a scrubbing process for removing hydrogen sulfide from the reduction cooling gas to maintain a low sulfur level when the reduction top gas is combined for export. An iron chelate process which provides elimination of hydrogen sulfide as elemental sulfur is useful in this instance.

In general, melter gasifier 1 comprises a lower section A, a central section B, an intermediate fusion section C between sections A and B, and an upper section D above the central section B, whose cross-section is widened and which serves as an expansion zone. The bottom region of lower section A of melter gasifier 1 serves to collect molten metal 11. A tapping opening 10 for liquid iron 11 is provided in wall 2. Further up the wall there is an optional opening 12 for the tap of any oxide slag residue resulting from the combustion of the petroleum coke and/or coal in lower section A.

A nozzle pipe 14 is inserted through an opening 13 in the lower region of central section B, thereby allowing reduction gas cyclone dust to be recirculated. Oxygen-containing carrier gas may be injected into the melter gasifier through nozzle pipe 14. If desired, carbon carriers as well as silicon and/or manganese carriers can be introduced into melter gasifier 1 in a first horizontal blow-in plane 15. Preferably, a plurality of openings 13 with nozzle pipes 14 are spaced about the circumference of the melter gasifier.

In central section B, a first fluidized bed zone 16 may be formed by coke and/or coal particles from combusted petroleum coke and/or coal. The intermediate fusion section C, which, in the embodiment illustrated, is cylindrically designed, is provided to accommodate a second zone 17 of a fluidized bed formed by coke particles from combustion of the petroleum coke. Generally, the coke particles in fusion section C will have less motion than the particles in section B.

Through the wall of the intermediate fusion section C a gas supply means is inserted. In the illustrated embodiment, the gas supply means is comprised of a nozzle pipe or tuyere 19 although depending upon the size of the melter gasifier, 10 to 40 and preferably 20 to 30 tuyeres 19 may be provided. Tuyeres 19 are located substantially in a second horizontal blow-in plane 21, positioned to direct the gases toward the central axis 18 of the melter gasifier and adapted for injecting oxygen-containing gas, steam, carbon dioxide, carbon carriers, silicon carriers, and/or manganese carriers into the melter gasifier. Tuyeres 19 project into the second zone 17 of coke particles, ending closely above a hearth layer 20. Preferably nozzle pipes 19 are arranged so as to be vertically pivotable in the direction of the double arrow 22. Additionally nozzle pipes 14, through which the carrier gas and return fines flow into the first fluidized-bed zone 16, are designed to be vertically pivotable in the preferred embodiment of the invention.

Ferrous material 8, introduced through opening 5, reaches the first fluidized-bed zone 16 after falling through upper section D of the melter gasifier. Section D serves as an expansion zone in which the ferrous material is slowed and heated. Smaller particles melt, drop through the second fusion zone 17 of coke particles and descend into lower section A. Larger particles at first remain lying on second zone 17 or are held fast in the uppermost layer of this zone, until they are also melted upon the action of the high temperature prevailing in the region of the first blow-in plane 15. In the second zone, the downwardly dropping metal melt is super-heated by oxygen which is introduced through nozzle pipes 19. The liquid iron 11, tapped through opening 10, is sufficiently hot to be subjected to further metallurgical treatment and transport.

Since there is no ash in the petroleum coke, no slag is formed with petroleum coke as the carbonaceous fuel. The petroleum coke particles, during operation of the melter gasifier, must be continuously supplemented through opening 4 with larger pieces, which are preferably used to build up second zone 17 after falling through first zone 16. The melter gasifier shown in FIG. 5 and the prior art operation using coal or coke produced from coal are described in U.S. Pat. No. 4,588,437, incorporated by reference herein for all purposes.

From the foregoing, it is apparent that the present invention provides a method of producing liquid iron having a low sulfur content in a fusion zone of a melting or smelting process when using carbonaceous fuel containing substantial sulfur which, when combusted, forms gases having a high sulfur content. In a preferred embodiment, the melting or smelting process is carried out in a melter gasifier having a fusion zone of about from 2 to 3 meters in depth. In accordance with the invention, the liquid iron is maintained saturated within the fusion zone with at least 4.5% carbon, preferably at least 4.7% carbon, and more preferably at least 5.0% carbon by weight of the liquid iron. In the preferred embodiment the desulfurization of the liquid iron in the fusion zone is enhanced by maintaining at least 0.3% silicon, and more preferably at least 0.5% of silicon by weight of the liquid iron. In at least one embodiment of the invention, desulfurization is further enhanced by the addition of at least 0.5% manganese by weight of the liquid iron in the fusion zone during the melting or smelting process. The manganese can be in addition to, or as a complete or partial substitute for, the silicon. Preferably the carbon, silicon, and manganese total at least 5.0% and more preferably, at least 5.2% by weight of the liquid iron in the fusion zone. The temperature of the liquid iron in the fusion zone is maintained in excess of 1,465° C., preferably at a temperature between about 1,465° C. and about 1,550° C., and most preferably at a temperature of about 1,490° C.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A method of producing liquid iron in a fusion zone of a smelting process, the method comprising the steps of:
   introducing iron oxide and carbonaceous fuel containing substantial sulfur into the fusion zone of the smelting process;
   injecting an oxygen source into the fusion zone to partially combust said carbonaceous fuel, wherein said carbonaceous fuel forms gases having a high sulfur content upon combustion;
   forming a high sulfur content liquid iron in the fusion zone; and
   saturating the high sulfur content liquid iron in the fusion zone with greater than 4.5% carbon by weight to form a substantially desulfurized liquid iron, wherein said saturating step does not include introducing lime or limestone into said fusion zone.

2. The method of claim 1, wherein said fusion zone is saturated with greater than 4.7% carbon by weight to form substantially desulfurized liquid iron.

3. The method of claim 1, further comprising the step of introducing lime or limestone into said fusion zone to form slag, said step of introducing lime or limestone into said fusion zone occurring after said substantially desulfurized liquid iron is formed.

4. The method of claim 1, further comprising the step of maintaining at least 0.3% silicon by weight in said fusion zone.

5. The method of claim 1, further comprising the step of maintaining at least 0.5% silicon by weight in said fusion zone.

6. The method of claim 1, further comprising the step of maintaining at least 0.3% manganese by weight in said fusion zone.

7. The method of claim 1, further comprising the step of maintaining at least 0.5% manganese by weight in said fusion zone.

8. The method of claim 1, further comprising the step of maintaining at least 5.0% carbon, silicon, and manganese by weight in said fusion zone.

9. The method of claim 1, further characterized in that the temperature of the substantially desulfurized liquid iron in the fusion zone during said saturating step is maintained in excess of 1,465° C.

10. The method of claim 9, further characterized in that the temperature of the substantially desulfurized liquid iron in the fusion zone during said saturating step is between about 1,465° C. and 1,550° C.

11. The method of claim 10, further characterized in that the temperature of the substantially desulfurized liquid iron in the fusion zone during said saturating step is about 1,490° C.

12. The method of claim 1, wherein slag is not formed within said saturating step.

13. The method of claim 1, wherein said substantially desulfurized liquid iron has a sulfur content of less than 0.05 percent by weight.

14. The method of claim 1, wherein said oxygen source is selected from the group consisting of oxygen and preheated air.

15. The method of claim 1, wherein said fusion zone has a length between about 0.15 and 3 meters.

16. A method of producing liquid iron in a fusion zone of a smelting process, the method comprising the steps of:
   introducing iron oxide and carbonaceous fuel containing substantial sulfur into the fusion zone of the smelting process;
   injecting an oxygen source into the fusion zone to partially combust said carbonaceous fuel, wherein said carbonaceous fuel forms gases having a high sulfur content upon combustion;
   forming a high sulfur content liquid iron in the fusion zone; and
   saturating the high sulfur content liquid iron in the fusion zone with greater than 4.5% carbon by weight and greater than 0.3% silicon by weight to form a substantially desulfurized liquid iron, wherein said saturating step does not include introducing lime or limestone into said fusion zone.

17. A method of producing liquid iron in a fusion zone of a smelting process, the method comprising the steps of:

introducing iron oxide and carbonaceous fuel containing substantial sulfur into the fusion zone of the smelting process;

injecting an oxygen source into the fusion zone to partially combust said carbonaceous fuel, wherein said carbonaceous fuel forms gases having a high sulfur content upon combustion;

forming a high sulfur content liquid iron in the fusion zone; and saturating the high sulfur content liquid iron in the fusion zone with greater than 4.5% carbon by weight and greater than 0.3% manganese by weight to form a substantially desulfurized liquid iron, wherein said saturating step does not include introducing lime or limestone into said fusion zone.

18. A method of producing liquid iron in a fusion zone of a smelting process, the method comprising the steps of:

introducing iron oxide and carbonaceous fuel containing substantial sulfur into the fusion zone of the smelting process;

injecting an oxygen source into the fusion zone to partially combust said carbonaceous fuel, wherein said carbonaceous fuel forms gases having a high sulfur content upon combustion;

forming a high sulfur content liquid iron in the fusion zone; and saturating the high sulfur content liquid iron in the fusion zone with greater than 4.5% carbon by weight and greater than 0.3% silicon by weight and greater than 0.3% manganese by weight to form a substantially desulfurized liquid iron, wherein said saturating step does not include introducing lime or limestone into said fusion zone.

19. A method of producing liquid iron in a fusion zone of a smelting process, the method comprising the steps of:

introducing metallic iron with a low sulfur content and carbonaceous fuel containing substantial sulfur into the fusion zone of said smelting process;

injecting an oxygen source into the fusion zone to partially combust said carbonaceous fuel, wherein said carbonaceous fuel forms gases having a high sulfur content upon combustion;

forming a high sulfur liquid iron in the fusion zone;

saturating and maintaining greater than 4.5% carbon by weight and greater than 0.3% manganese by weight in the fusion zone;

maintaining a temperature within the fusion zone of at least 1,465° C.;

forming a substantially desulfurized liquid iron without the introduction of lime or limestone into fusion zone, wherein said substantially desulfurized liquid iron has less than 0.1% sulfur by weight; and rejecting sulfur from the liquid iron.

* * * * *